(12) United States Patent
Baiera

(10) Patent No.: US 10,221,994 B2
(45) Date of Patent: Mar. 5, 2019

(54) MODULAR MOUNTING SYSTEM

(71) Applicant: Steven Marc Baiera, Avon, NY (US)

(72) Inventor: Steven Marc Baiera, Avon, NY (US)

( * ) Notice: Subject to any disclaimer, the term of this patent is extended or adjusted under 35 U.S.C. 154(b) by 323 days.

(21) Appl. No.: 15/214,235

(22) Filed: Jul. 19, 2016

(65) Prior Publication Data

US 2018/0023757 A1 Jan. 25, 2018

(51) Int. Cl.
| | |
|---|---|
| F16L 3/08 | (2006.01) |
| F16L 3/123 | (2006.01) |
| F16L 3/22 | (2006.01) |
| F16M 13/02 | (2006.01) |
| E04H 12/22 | (2006.01) |
| F16L 3/10 | (2006.01) |
| F16L 3/12 | (2006.01) |
| F16L 3/00 | (2006.01) |

(52) U.S. Cl.
CPC .............. *F16M 13/02* (2013.01); *E04H 12/22* (2013.01); *F16L 3/006* (2013.01); *F16L 3/1091* (2013.01); *F16L 3/1222* (2013.01); *F16L 3/22* (2013.01)

(58) Field of Classification Search
CPC ....... F16L 3/006; F16L 3/1091; F16L 3/1222; F16L 3/22; F16M 13/02; E04H 12/22
USPC ......... 248/56, 62, 68.1, 71, 74.1, 74.2, 74.3, 248/74.4, 74.5, 513
See application file for complete search history.

(56) References Cited

U.S. PATENT DOCUMENTS

| 2,288,158 | A | | 6/1942 | Ellinwood | |
|---|---|---|---|---|---|
| 2,355,742 | A | * | 8/1944 | Morehouse | F16L 3/2235 174/40 CC |
| 2,937,835 | A | * | 5/1960 | Csmereka | F16L 3/1091 248/68.1 |
| 3,531,071 | A | * | 9/1970 | Kubli | F16L 3/2235 248/68.1 |
| 4,595,162 | A | | 6/1986 | Matsummura et al. | |
| 5,261,633 | A | * | 11/1993 | Mastro | F16L 3/18 248/68.1 |
| 5,996,945 | A | * | 12/1999 | Coles | F16L 3/2235 24/16 R |
| 6,173,926 | B1 | * | 1/2001 | Elvegaard | F16L 3/1075 248/68.1 |
| 6,561,466 | B1 | * | 5/2003 | Myers | F16L 3/221 248/68.1 |
| 7,806,374 | B1 | * | 10/2010 | Ehmann | H02G 3/22 174/40 R |

(Continued)

FOREIGN PATENT DOCUMENTS

| DE | 749654 | C | * | 11/1944 | ............ | F16L 3/1091 |
|---|---|---|---|---|---|---|
| DE | 3524278 | A1 | * | 1/1987 | ............... | F16L 5/14 |

(Continued)

*Primary Examiner* — Joshua E Rodden

(57) ABSTRACT

The present invention is a Modular Mounting System used to mount a hollow or solid, elongated or partially elongated member such as, but not limited to, a tube, hose, wiring harness, spindle, baluster, post, shaft or pipe to another hollow or solid, elongated or partially elongated member such as those previously listed where the exterior shape of the short-side cross-section of either member may be of any shape and not simply limited to a circular form. And where the elongated or partially elongated members may or may not run parallel to one another, and where one mounted member supports the other mounted member so that no other mounting is required or provided for.

5 Claims, 9 Drawing Sheets

(56) References Cited

U.S. PATENT DOCUMENTS

| | | | |
|---|---|---|---|
| 8,596,589 B2 * | 12/2013 | Hennon | F16L 3/222 |
| | | | 248/65 |
| 8,882,066 B2 * | 11/2014 | Otten | B65D 63/00 |
| | | | 248/229.14 |
| 8,985,533 B2 * | 3/2015 | Edmond | F16L 3/227 |
| | | | 248/68.1 |
| 9,062,800 B2 | 6/2015 | Sampson | |
| 9,601,241 B2 * | 3/2017 | Dannenberg | H02G 3/32 |
| 2009/0218451 A1 * | 9/2009 | Lundborg | F16L 5/02 |
| | | | 248/56 |
| 2012/0217353 A1 * | 8/2012 | Hennon | F16L 3/1091 |
| | | | 248/67.5 |
| 2016/0020592 A1 * | 1/2016 | Beele | H02G 3/22 |
| | | | 248/56 |
| 2017/0284567 A1 * | 10/2017 | Gaw | F16L 3/1091 |

FOREIGN PATENT DOCUMENTS

| | | | | |
|---|---|---|---|---|
| GB | 2186442 A | * | 8/1987 | F16L 5/08 |
| GB | 2204922 A | * | 11/1988 | F16L 5/08 |

* cited by examiner

MODULAR MOUNTING SYSTEM

TECHNICAL FIELD

The present invention relates to block style support mechanisms used to mount elongated members.

BACKGROUND

Both block style and clamp ring type supports are commonly used to support elongated members such as pipes, tubes, hoses, wiring harnesses, and the like. Often these apparatuses employ the use of a single circular grommet or two joined semi-circular grommets which form a passage having an inside diameter which surrounds the elongated member. These apparatuses are often held together by various means such as screws, bolts or other assemblies, which apply the force needed to hold the elongated member in place.

Additionally, inserts are also commonly used for various reasons such as to reduce the size of the inside diameter of the tubular passage; to reduce vibration or noise; or to alter the frictional properties of the device.

Such apparatuses are typically mounted to an external support structure other than the elongated members, and they are often utilized to support industrial members such as pipes, conduits, hoses and similar elongated members.

However, many of these apparatus suffer from one or more limitations such as the utilization of a separate mechanism to support the apparatus (Sampson U.S. Pat. No. 9,062,800 B2); passages which typically run in parallel (Ellinwood U.S. Pat. No. 2,288,158); can only be used to support round tubular members (Sampson U.S. Pat. No. 9,062,800 B2; Ellinwood U.S. Pat. No. 2,288,158; Matsumura et al U.S. Pat. No. 4,595,162 and many others); and most of these apparatuses are not suitable (safe) for use in areas frequented by people or animals due to their harsh industrial characteristics such as square, rough and/or sharp edges. These limitations are most likely due to the intended use of the apparatus to support industrial members as those previously stated.

The above limitations and others are addressed by the invention which is the topic of this disclosure as summarized below.

SUMMARY

The present invention is a Modular Mounting System used to mount a hollow or solid, elongated or partially elongated member such as, but not limited to, a tube, hose, wiring harness, spindle, baluster, post, shaft or pipe to another hollow or solid, elongated or partially elongated member such as those previously listed where the exterior shape of the short-side cross-section of either member may be of any shape and not simply limited to a circular form. And where the elongated or partially elongated members may or may not run parallel to one another, and where one mounted member supports the other mounted member so that no other mounting is required or provided for.

The present invention features interchangeable front and back modular inserts which may have different interior shaped and sized bores or holes that form the passages that support the elongated or partially elongated members. Various embodiments of these inserts are possible so that elongated or partially elongated members with short-side cross-sections of various shapes and sizes can be supported such as, but not limited to, round, square, rectangular, rounded-rectangular, hexagonal, octagonal or other polygonal shaped members.

Partially elongated members must be of adequate length to pass through the modular mounting system so that the member may be properly secured.

Additionally, the bore or passage through the modular inserts can be made at various angles including but not limited to 90 degrees perpendicular to the top and bottom faces of the modular insert. This allows the elongated or partially elongated members to be angularly offset from each other rather than being limited to a parallel orientation.

While the present invention features interchangeable front and back modular inserts, it is possible to utilize the modular mounting system with or without one or both front and/or back modular inserts in place.

It is an object of the present invention to provide a means of attaching elongated or partially elongated members to one another via the use of applied force and friction to support the elongated members in a manner which is intended to be non-marring or non-damaging to the supported members.

Another object of the present invention is to provide a mounting that does not require fasteners to be placed into the elongated or partially elongated members being secured.

Another object of the present invention is to provide a mounting or support for solid-core as well as hollow-core elongated or partially elongated members.

Another object of the present invention is to provide a mounting or support for elongated or partially elongated members where the exterior shape of the short-side cross-section of either member may be of any shape and not simply limited to a circular form.

Another object of the present invention is to provide a mount for the elongated or partially elongated members that does not require attachment to an external support structure.

Another object of the present invention is to provide a mount that does not possess the same harsh characteristics as other mounts or clamps; thus making it a better alternative for use in areas frequented by people or animals, and not simply limited to industrial usage.

Another object of the present invention is to provide a mount that can be utilized horizontally, vertically or at any angle in between.

Finally, another object of the present invention is to provide a mount for elongated or partially elongated members that may run parallel to one another or may be offset angularly.

The afore mentioned and other aspects of this invention will be described in greater detail below with reference to the attached drawings.

BRIEF DESCRIPTION OF THE DRAWINGS

FIG. 23 is a back elevation view of part 1a;

The broken lines shown in the figures (FIGS. 12 & 13) depict unclaimed environment and form no part of the claimed invention.

Figure 3:
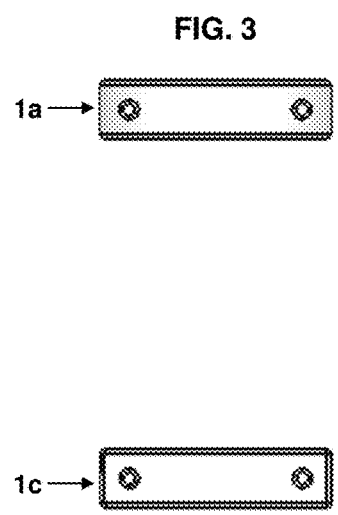
FIG. 3 is a front elevation view of FIG. 1.
Figure 4:
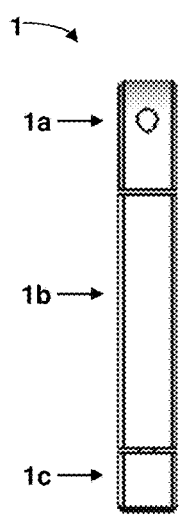
FIG. 4 is a back elevation view of FIG. 1.
Figure 4:
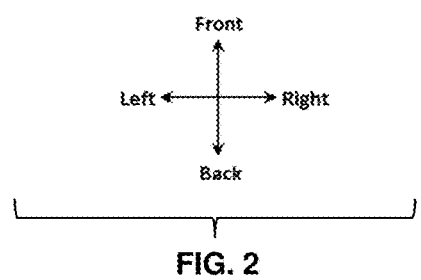
Figure 7:
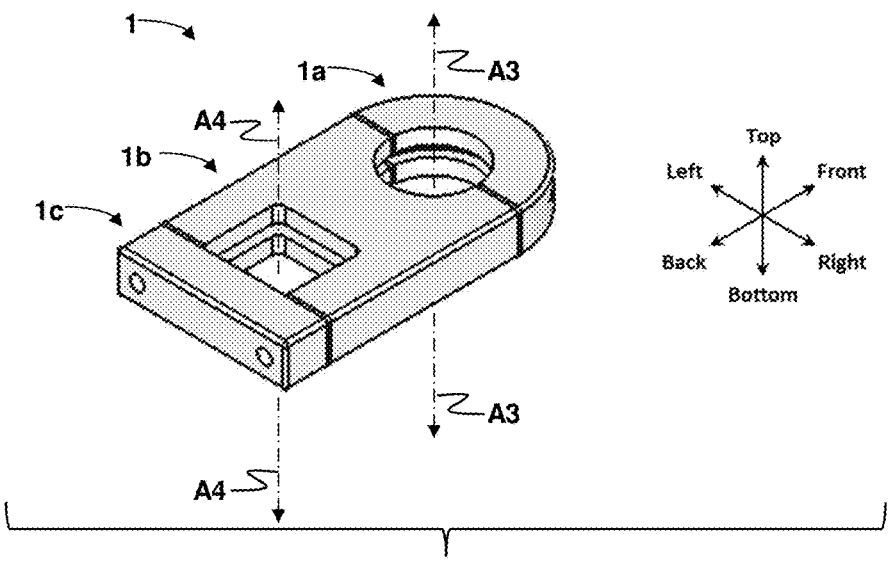
FIG. 7 is an orthographic view of the same modular mounting system in FIG. 1 with both front and back modular inserts removed.

The front and back elevation views of FIG. 7 remain the same as shown in FIG. 3 and FIG. 4 respectively.

DETAILED DESCRIPTION

Figure 1:
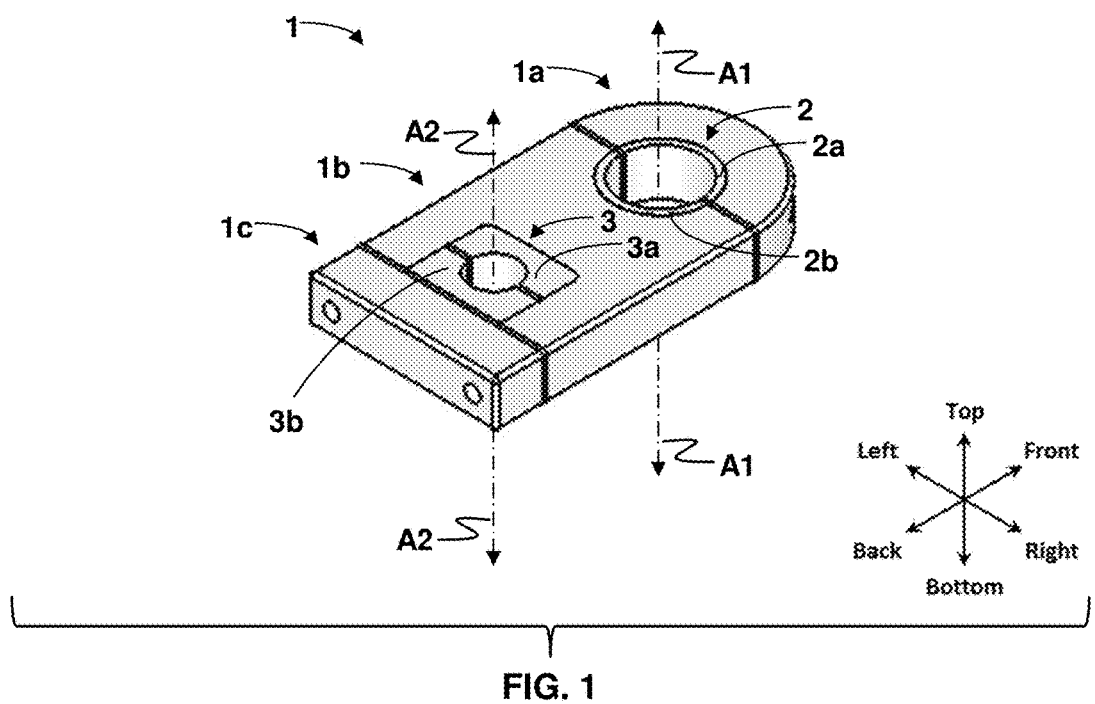
FIG. 1 is an orthographic view of the Modular Mounting System with one embodiment of both the front and back modular inserts in place.

The present invention is a Modular Mounting System 1 comprised of:
a three-part main body (front 1a, middle 1b and back 1c);
a rounded front modular insert 2;
a rectangular-shaped back modular insert 3 as shown in FIG. 1.

The rounded front modular insert 2 is comprised of two halves: a front half 2a and a back half 2b. When assembled, parts 2a and 2b form a passage with an axis A1 as shown in FIG. 1. An elongated or partially elongated member passes through this passage and is secured by the front modular insert 2.

The rectangular-shaped back modular insert 3 is comprised of two halves: a front half 3a and a back half 3b. When assembled, parts 3a and 3b form a passage with an axis A2 as shown in FIG. 1. An elongated or partially elongated member passes through this passage and is secured by the back modular insert 3.

The embodiments of the front modular inserts 2 and back modular inserts 3 shown in FIG. 1 are examples of just one possible embodiment of each insert. These embodiments illustrate the use of both the front modular inserts 2 and the back modular inserts 3 to support round elongated or partially elongated members (those members with a circular short-size cross-section) running in parallel.

The present invention is capable of supporting elongated or partially elongated members with short-side cross-sections which may be noncircular. Additionally, the size and shape of the short-side cross-section of each member may be dissimilar from one another.

Figure 28:
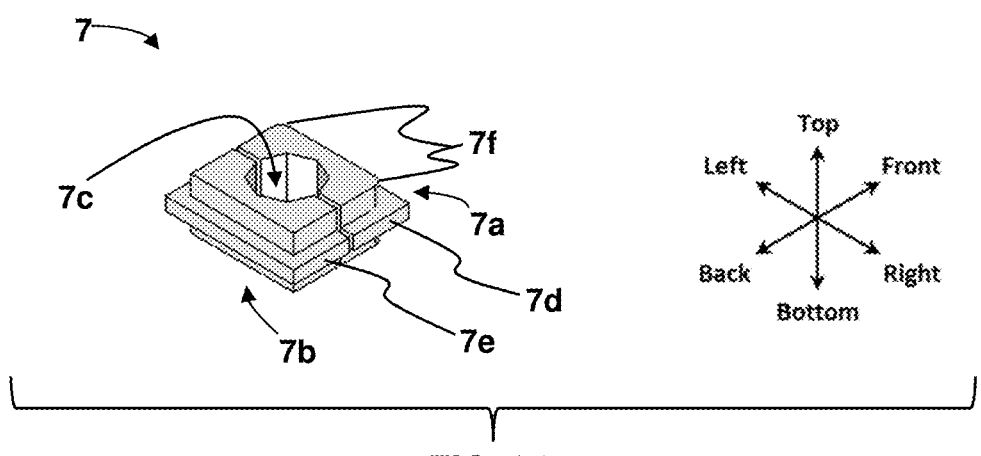
FIG. 28 is an orthographic view of one alternative embodiment of a back modular insert with a noncircular (octagonal) bore.

For illustrative purposes, an alternative embodiment 7 of the back modular insert is shown in FIG. 28. This particular alternative embodiment features an octagonal bore and passage 7c, which is formed when parts 7a and 7b are assembled within the modular mounting system. While this embodiment is specific to the back modular insert, the front modular insert may feature noncircular passages as well.

The present invention is also capable of supporting elongated or partially elongated members that are not parallel to one another. The elongated or partially elongated members may run parallel to one another or may be offset angularly.

Figure 27:
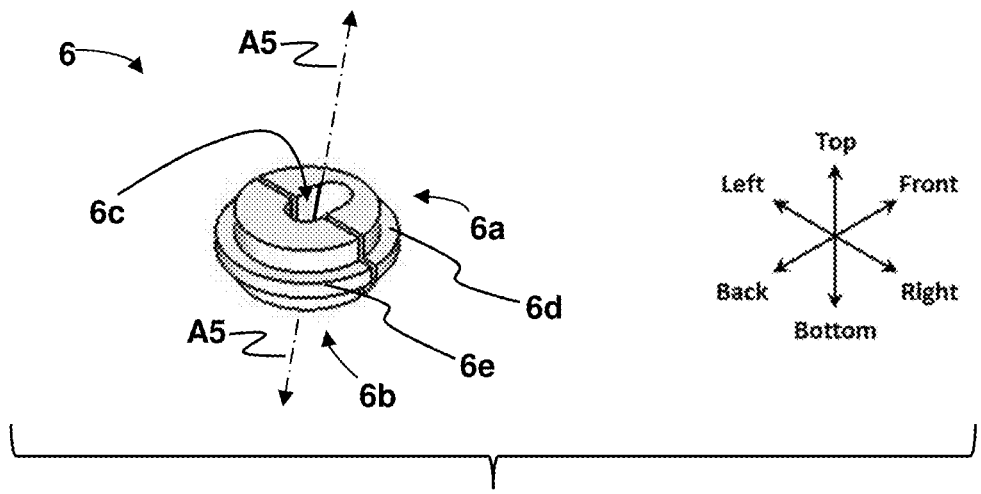
FIG. 27 is an orthographic view of one alternative embodiment of a front modular insert with an angular bore.

For illustrative purposes, an alternative embodiment 6 of the front modular insert is shown in FIG. 27. This particular alternative embodiment features an angular bore and passage 6c with an axis A5 which is not perpendicular to the main body. This passage 6c is formed when parts 6a and 6b are assembled within the modular mounting system. While this embodiment is specific to the front modular insert, the back modular insert may feature an angular bore as well.

The present invention can be utilized horizontally, vertically or at any angle in between.

The present invention is capable of supporting elongated or partially elongated members that have either a solid or hollow core.

The present invention may be composed of a metal or polymeric material such as plastic or vinyl. The modular front inserts and back inserts may also be composed of a metal or polymeric material such as plastic or vinyl. Or the modular front inserts and back inserts may be composed of an elastomeric material, or alternatively an elastomeric coating may be applied to the inside passage of the front and/or back modular inserts.

The present invention and the related front and back modular inserts can be produced via milling or mass produced via an injection molding process.

The present invention is intended to be non-marring or non-damaging. As such, the present invention uses applied force and friction to support the elongated or partially elongated members and does require fasteners into the members being supported.

Furthermore, the present invention does not require attachment to an external support structure as such no other mounting is required or provided for.

Figure 6:
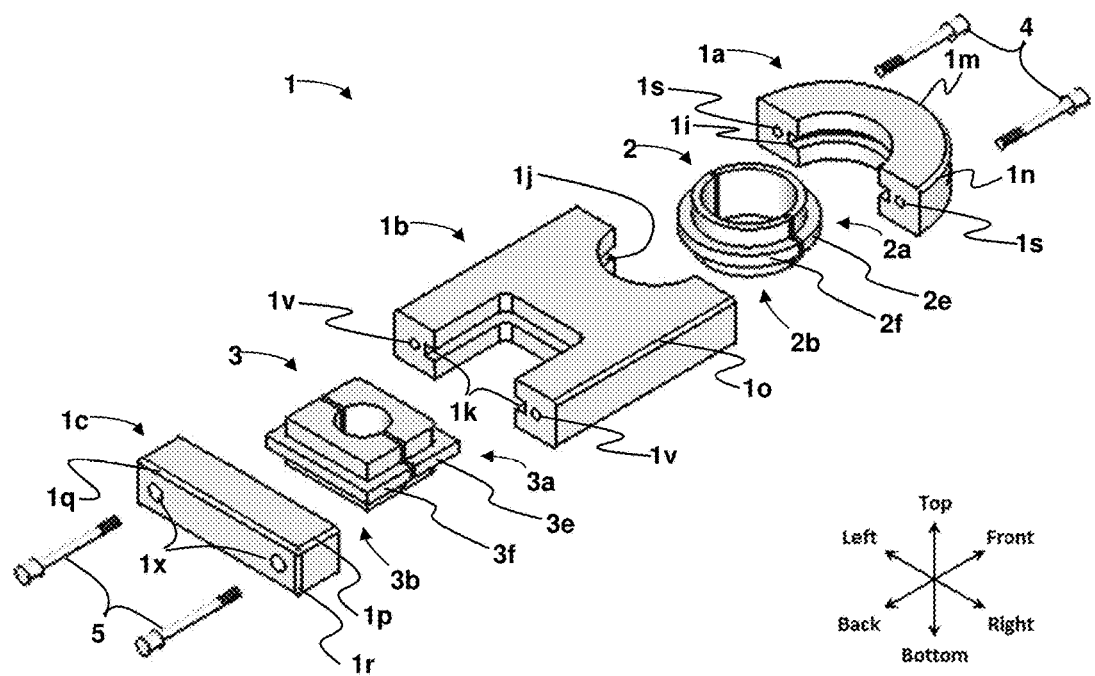
FIG. 6 is an exploded orthographic view of FIG. 1.

Finally, unlike many industrial mounts, the present invention as shown in FIG. 6 features a smooth rounded front design 1m and rounded edges 1n, 1o, 1p, 1q, 1r making it a safer alternative for areas frequented by people or animals.

Figure 2:
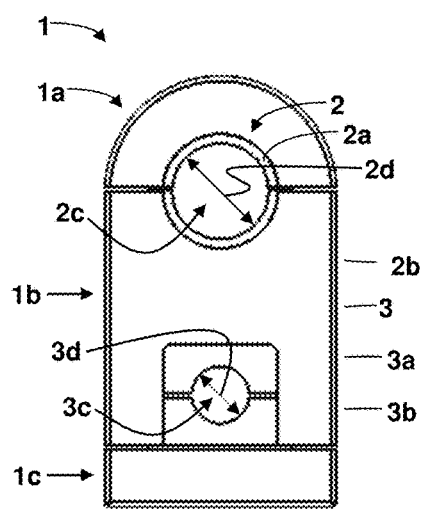
FIG. 2 is a top side plan view of FIG. 1 with the bottom side plan view being a mirror-image.

Referring to FIG. 2 the passage 2c formed by the assembly of halves 2a and 2b of the one embodiment of the front modular insert 2 shown has an inside diameter 2d. This diameter is approximately equivalent given tolerances to the outside diameter of the elongated or partially elongated member being secured by the Modular Mounting System 1. The front modular insert is held in place by the fastening of part 1a to part 1b.

Still referring to FIG. 2 the passage 3c formed by the assembly of halves 3a and 3b of the one embodiment of the back modular insert 3 shown has an inside diameter 3d. This diameter is approximately equivalent given tolerances to the outside diameter of the elongated or partially elongated member being secured by the Modular Mounting System 1. The back modular insert is held in place by the fastening of part 1c to part 1b.

Figure 5:
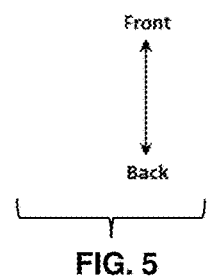
FIG. 5 is a side elevation view of FIG. 1 with the opposite side elevation view being a mirror-image.

FIG. 3 and FIG. 4 provide a front elevation view of part 1a, and a back elevation view of part 1c respectively, while FIG. 5 provides a side elevation view of parts 1a, 1b and 1c of the Modular Mounting System 1.

The exploded view FIG. 6 illustrates how the overall Modular Mounting System 1 is assembled with one possible embodiment of each the front modular insert 2 and the back modular insert 3. The groove 1i in the back of part 1a accepts either the tongue 2e on part 2a, or tongue 2f on part 2b. The groove 1j in the front of part 1b accepts either the tongue 2e on part 2a, or tongue 2f on part 2b. Part 1a is then attached to part 1b using fasteners 4. Force is applied to the elongated or partially elongated members passing through the front modular insert 2 by the tightening of the fasteners 4 which attach part 1a to part 1b and compress the two halves 2a and 2b of front modular insert 2 around the elongated or partially elongated member. The member is then held in place by the applied force and friction. Similarly, the groove 1k in the back of part 1b accepts the tongue 3e on part 3a. The groove in the front of part 1c (not visible) accepts the tongue 3f on part 3b. Part 1c is then attached to part 1b using fasteners 5. Force is applied to the elongated or partially elongated members passing through the back modular insert 3 by the tightening of the fasteners 5 which attach part 1c to part 1b and compress the two halves 3a and 3b of back modular insert 3 around the elongated or partially elongated member. The member is then held in place by the applied force and friction. At this point both members have been secured to one another through the assembly of the Modular Mounting System 1.

Below is a description of each part or feature shown in explode view FIG. 6.

REF DESCRIPTION

1 The Modular Mounting System
1a Front Portion of Modular Mounting System
1b Middle Portion of Modular Mounting System
1c Back Portion of Modular Mounting System
1i Groove in part 1a which accepts the tongue 2e on part 2a, or tongue 2f on part 2b
1j Groove in front of part 1b which accepts tongue 2f on part 2b, or tongue 2e on part 2a
1k Groove in back of part 1b which accepts tongue 3e on part 3a
1m Round front exterior profile of part 1a
1n Rounded exterior edges of part 1a
1o Rounded exterior edges of part 1b
1p Rounded exterior edges of part 1c—4 short sides
1q Rounded exterior edges of part 1c—2 long sides
1r Rounded exterior edges of part 1c—2 short sides
1s Fastener holes through part 1a
1v Fastener holes through back of part 1b
1x Recess for fastener head
2 Front Modular Insert
2a Front half of the Front Modular Insert
2b Back half of the Front Modular Insert
2e Tongue on part 2a which fits into groove 1i on part 1a or groove 1j on part 1b
2f Tongue on part 2b which fits into groove 1j on part 1b or groove 1i on part 1a
3 Back Modular Insert
3a Front half of the Back Modular Insert
3b Back half of the Back Modular Insert
3e Tongue on part 3a which fits into groove 1k on part 1b
3f Tongue on part 3b which fits into the groove on front side of part 1c (groove not visible in this view)
4 Front Fasteners, which attach part 1a to part 1b
5 Back Fasteners, which attached part 1c to part 1b As previously mentioned, it is possible to utilize the Modular Mounting System with or without one or both front and/or back inserts in place. The Modular Mounting System 1 is shown without the use of either the front or back modular inserts in FIG. 7, FIG. 8 and FIG. 9.

Figure 8:
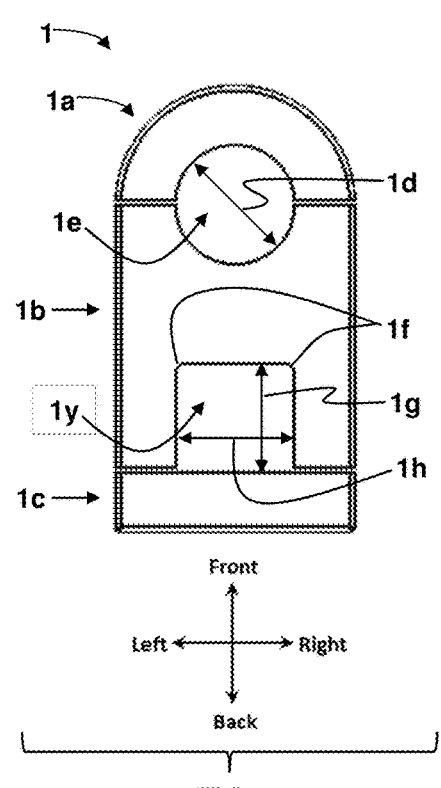
FIG. 8 is a top side plan view of FIG. 7 with the bottom side plan view being a mirror-image.

When the Modular Mounting System 1 is assembled without the use of the front modular insert, parts 1a and 1b form a circular passage with an axis A3 as shown in FIG. 7. Referring to FIG. 8, an elongated or partially elongated member of appropriate size passes through the passage 1e, which has a diameter 1d. The elongated or partially elongated member is secured by parts 1a and 1b of the Modular Mounting System 1 through applied force and friction.

When the Modular Mounting System 1 is assembled without the use of the back modular insert, parts 1b and 1c form a rectangular-shaped passage with an axis A4 as shown in FIG. 7. Referring to FIG. 8, this passage 1y has a height 1g and width 1h and features rounded corners 1f on the front of the rectangular-shaped passage. An elongated or partially elongated member of appropriate shape and size given tolerances passes through this passage and is secured by parts 1b and 1c of the Modular Mounting System 1 through applied force and friction.

Figure 9:
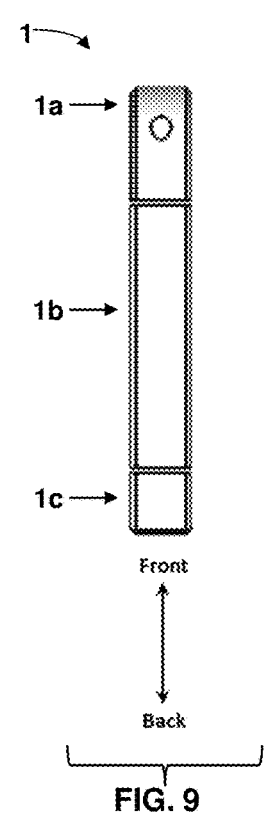
FIG. 9 is a side elevation view of FIG. 7 with the opposite side elevation view being a mirror-image.

FIG. 9 provides a side elevation view of parts 1a, 1b and 1c of the Modular Mounting System 1.

Figure 10:
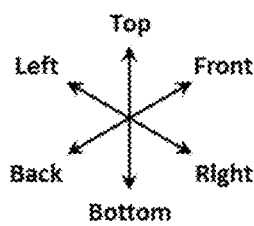
FIG. 10 is an orthographic view of one embodiment of the modular mounting system illustrating the use of the mount with one embodiment of the front modular insert in place and the back modular insert removed.
Figure 10:
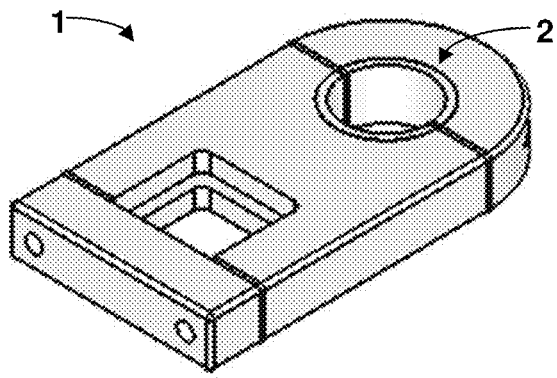

The Modular Mounting System 1 is shown with one embodiment of the front modular insert 2 and without a back modular insert utilized in FIG. 10. Other embodiments of the front modular insert are possible. An alternative embodiment is illustrated in FIG. 27.

Figure 11:
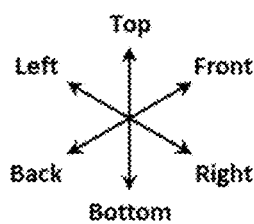
FIG. 11 is an orthographic view of one embodiment of the modular mounting system illustrating the use of the mount with one embodiment of the back modular insert in place and the front modular insert removed.
Figure 11:
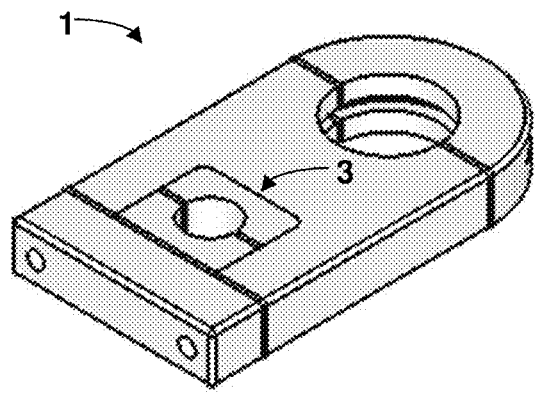

The Modular Mounting System 1 is shown with one embodiment of the back modular insert 3 and without a front modular insert utilized in FIG. 11. Other embodiments of the back modular insert are possible. An alternative embodiment is illustrated in FIG. 28.

Figures 12, 13:
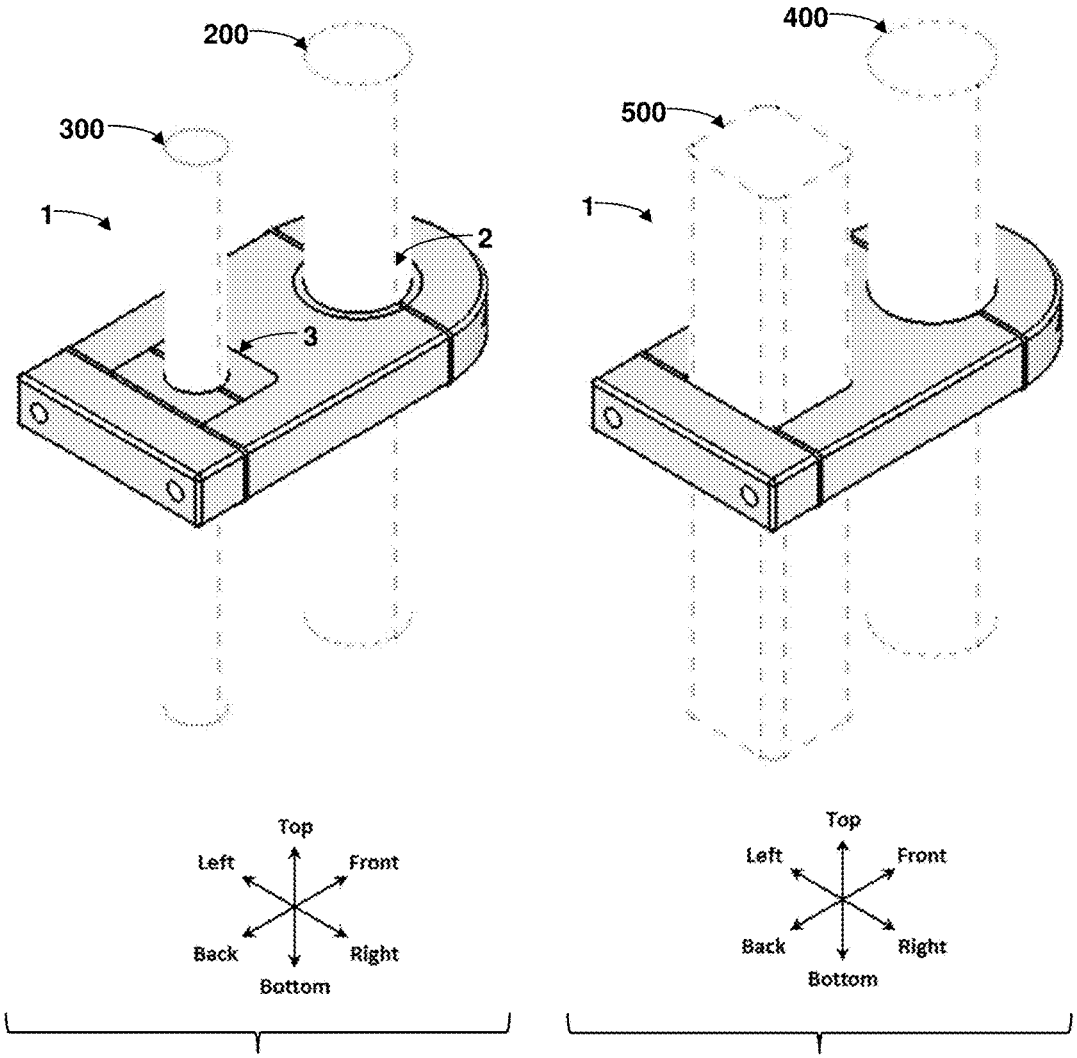
FIG. 12 is an orthographic view of FIG. 1 illustrating the use of the modular mounting system as shown in FIG. 1 employing one embodiment of both the front and back inserts to hold two circular elongated members.
FIG. 13 is an orthographic view of FIG. 7 illustrating the use of the mount as shown in FIG. 7 employing the modular mounting system to hold two elongated members (one non-circular) without the use of either front or back modular inserts.

FIG. 12 illustrates the use of the Modular Mounting System 1 employing one embodiment of both the front modular insert 2 and the back modular insert 3 to secure two circular elongated members 200 and 300 respectively.

FIG. 13 illustrates the use of the Modular Mounting System 1 to secure two elongated members 400 and 500 (one a noncircular square tube with rounded corners 500). In this case, neither the front modular insert or back modular insert are utilized.

Figure 14:
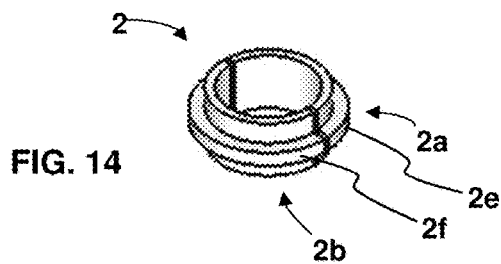
FIG. 14 is an orthographic view of one embodiment of a front modular insert.
Figure 16:
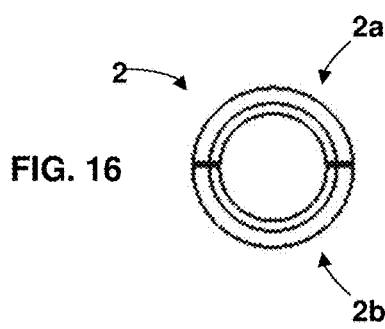
FIG. 16 is a top side plan view of FIG. 14 with the bottom side plan view being a mirror-image.

FIG. 14, FIG. 15, FIG. 16 and FIG. 17 provide additional views of one possible embodiment of the front modular insert 2. As previously stated, the front modular insert 2 is comprised of two halves 2a and 2b as shown in FIG. 14 and FIG. 16. Each of these halves 2a and 2b have the same exterior size and shape and the tongue 2e on half 2a is identical to the tongue 2f on half 2b; however, the interior shape of 2a and 2b may differ. Since the external size and shape of the two halves 2a and 2b of the front modular insert 2 are identical, this allows the front modular insert 2 to rotate 360 degrees within the passage (FIG. 8 1e) formed between parts 1a and 1b.

Figure 18:
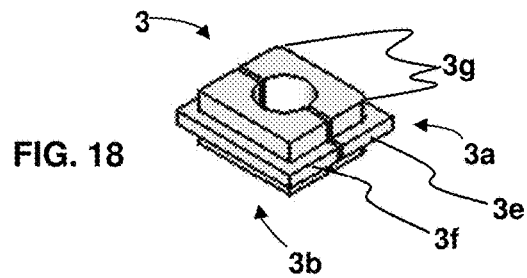
FIG. 18 is an orthographic view of one embodiment of a back modular insert.
Figure 15:
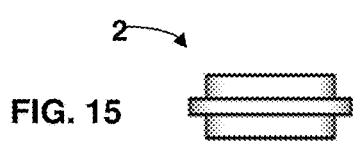
FIG. 15 is a front elevation view of FIG. 14 with the back elevation view being a mirror-image.
Figure 19:
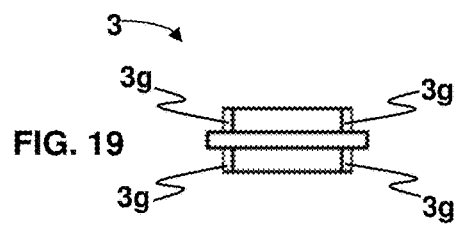
FIG. 19 is a front elevation view of FIG. 18.
Figure 20:
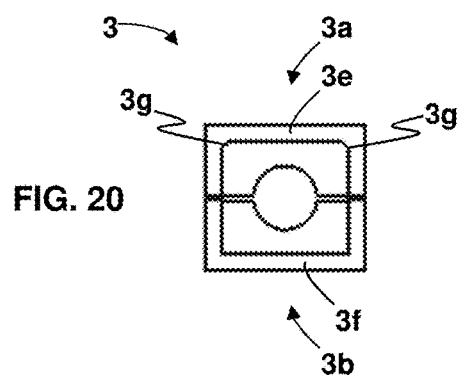
FIG. 20 is a top side plan view of FIG. 18 with the bottom side plan view being a mirror-image.
Figure 17:
FIG. 17 is a side elevation view of FIG. 14 with the opposite side elevation view being a mirror-image.
Figure 21:
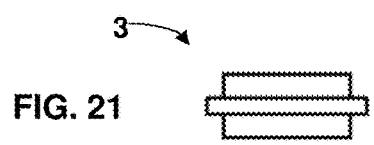
FIG. 21 is a back elevation view of FIG. 18.
Figure 22:
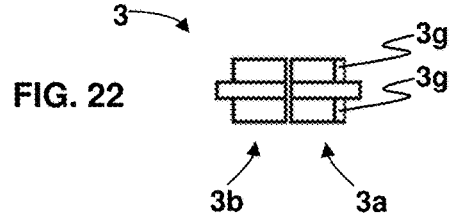
FIG. 22 is a side elevation view of FIG. 18 with the opposite side elevation view being a mirror-image.

FIG. 18, FIG. 19, FIG. 20, FIG. 21 and FIG. 22 provide additional views of one possible embodiment of the back modular insert 3. As previously stated, the back modular insert 3 is comprised of two halves 3a and 3b as shown in FIG. 18, FIG. 20 and FIG. 22. Referring to FIG. 18 and FIG. 20, like the two halves of the front modular insert, the two halves 3a and 3b of the back modular insert 3 feature tongues 3e and 3f on each half respectively. However, unlike the front modular insert, each of these halves 3a and 3b are slightly different. The front half 3a features rounded front corners 3g as shown in FIG. 18, FIG. 19, FIG. 20 and FIG. 22, while the back half 3b does not. As such the back modular insert 3 can only be inserted into the Modular Mounting System in one direction, which determines and controls the orientation of the elongated or partially elongated member being secured by the back modular insert 3.

Figure 23:
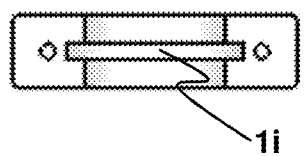
Figure 24:
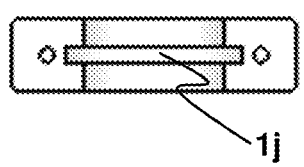
FIG. 24 is a front elevation view of part 1b.
Figure 25:
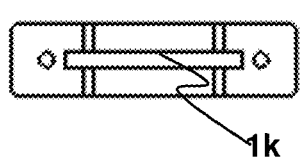
FIG. 25 is a back elevation view of part 1b.
Figure 26:
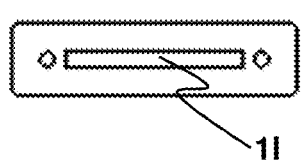
FIG. 26 is a front elevation view of part 1c.

FIG. 23, FIG. 24, FIG. 25 and FIG. 26 provide additional views of parts 1a, 1b or 1c. Groove 1i on the back side of part 1a is shown in FIG. 23. Groove 1i accepts the tongue feature on the either half of the front modular insert. Groove 1j on the front side of part 1b is shown in FIG. 24. Groove 1j also accepts the tongue feature on the either half of the front modular insert. Groove 1k on the back side of part 1b is shown in FIG. 25. Groove 1k accepts the tongue feature on the front half of the back modular insert. Groove 1l on the front side of part 1c is shown in FIG. 26. Groove 1l accepts the tongue feature on the back half of the back modular insert.

The tongue and groove features on the Modular Mounting System and associate front and back modular inserts, previously described herein, provide for both fitment and alignment of the modular inserts within the Modular Mounting System.

The preceding description of the present invention, a Modular Mounting System for elongated or partially elongated members outlines the features and benefits of the Modular Mounting System and how it meets the objectives stated herein.

While certain embodiments of the present invention are described and illustrated in this document, it is not possible to describe or illustrate all possible forms of the Modular Mounting System or the modular inserts utilized. The text provided is meant to describe the present invention but not limit it to a particular embodiment. It should be understood by those skilled in the art that various changes and modifications may be made without deviating from the scope of the present invention.

What is claimed is:

1. A modular mounting system (1) comprising:
    a three-part main body in the form of a front portion (1a), a middle portion (1b), and a back portion (1c) held together by fasteners (4, 5), with a first plurality of said fasteners (4, 5) joining the front portion (1a) and the middle portion (1b), and a second plurality of said fasteners (4, 5) joining the middle portion (1b) and the back portion (1c);
    a rounded front modular insert (2), which can be rotated, the front modular insert (2) having a front half (2a) and a back half (2b) which together form the front modular insert (2), the front half (2a) and the back half (2b) each have tongues (2e, 2f) for mating with grooves (1i, 1j) on the first portion (1a) and the second portion (1b);
    a directionally oriented rectangular-shaped back modular insert (3), with rounded front corners (3g), the rectangular-shaped back modular insert (3) having a front half (3a) and a back half (3b) which together form the rectangular-shaped back modular insert (3), the front half (3a) and the back half (3b) each have tongues (3e, 3f) for mating with grooves (1k, 1l) on the second portion (1b) and the third portion (1c);
    the rounded front modular insert (2) and the rectangular-shaped back modular insert (3) are both used to mount hollow or solid tubular members (200, 300, 400, 500).

2. The modular mounting system (1) according to claim 1, wherein the modular mounting system (1) is configured to be utilized with or without either or both the front (2) and back (3) modular inserts to secure the members (200, 300, 400, 500) through applied force and friction.

3. The modular mounting system (1) according to claim 2, wherein an interior shape of passages (A1, A2, A5) formed by use of either the front (2) or back modular (3) inserts are a geometric shape (6c, 7c) which is either one of circular or non-circular to accept and support the members (200, 300, 400, 500) with an exterior shape of circular or non-circular cross-section.

4. The modular mounting system (1) according to claim 3, wherein the modular mounting system (1) is configured to be utilized with either or both the front (2) and back (3) modular inserts to secure the members (200, 300, 400, 500) such that the members (200, 300, 400, 500) do not run parallel to one another.

5. The modular mounting system (1) according to claim 4, wherein the modular mounting system (1) is configured to support the members (200, 300, 400, 500) such that one of the members (200, 300, 400, 500) supports another one of the members (200, 300, 400, 500) so that no other mounting is required.

* * * * *